Dec. 6, 1927. E. HABER Re. 16,807

HEAT EXCHANGER

Original Filed Feb. 3, 1922 3 Sheets-Sheet 1

Witnesses:
W. Wirth
A. Salzwedel

Inventor:
Eugen Haber
by Fritz Mach
Attorney

Dec. 6, 1927. E. HABER Re. 16,807

HEAT EXCHANGER

Original Filed Feb. 3, 1922. 3 Sheets-Sheet 2

Witness:
W. Smith
A. Sabrowski

Inventor
Eugen Haber
by F. Hunt
Atty

Dec. 6, 1927. E. HABER Re. 16,807

HEAT EXCHANGER

Original Filed Feb. 3. 1922 3 Sheets-Sheet 3

Witnesses:
W. Smith
A. Sabourcell

Inventor
Eugen Haber
by Fr. Stark
Attorney

Reissued Dec. 6, 1927. Re. 16,807

UNITED STATES PATENT OFFICE.

EUGEN HABER, OF BERLIN-CHARLOTTENBURG, GERMANY.

HEAT EXCHANGER.

Original No. 1,635,838, dated July 12, 1927, Serial No. 533,929, filed February 3, 1922. Application for reissue filed September 12, 1927. Serial No. 219,127.

The invention relates to a heat exchanging element working according to the cross current principle which consists of any number of cells composed of plates which have angle portions cut out of the corners.

The free edges of the plates are alternately bent upward or downward so that these superposed plates form cells which may be sealed at the edges. The cells formed are alternately open at the longitudinal sides and at the cross sides so that in the element two sets of channels one set for the air and the other for the heating gases, are produced, which are utilized for the exchange of heat, the separation of the air and gas channels, the one from the other is effected by means of corner pieces fitting into the cut out portions at the corners of the plates.

The independent cells are subdivided by undulated strips of sheet metal and all the parts of the element are connected the one with the other by transverse bolts and nuts so that the plates form a rigid body without soldering of the edges of the plates which are in contact.

The transverse bolts can be tubular and provided with holes so that if the outer ends of the said bolts are connected with a steam pipe, the cells can be easily cleaned by blowing the same out or in any other convenient manner.

In order that the invention may be clearly understood, I shall proceed to describe the same with reference to the several forms of construction shown by way of example on the accompanying drawings, wherein:—

Figure 1:
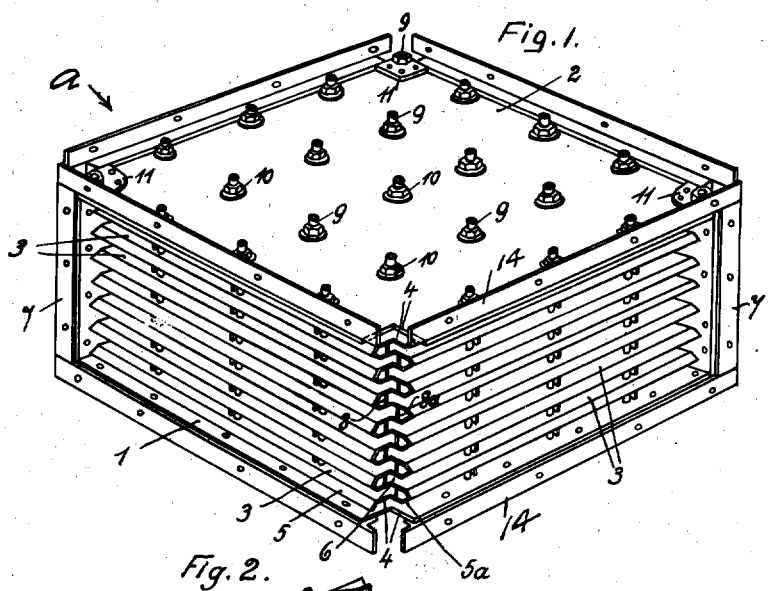
Figure 1 is a perspective view of a heat exchanging element, the corner piece having been removed from the front corner.
Figure 2:
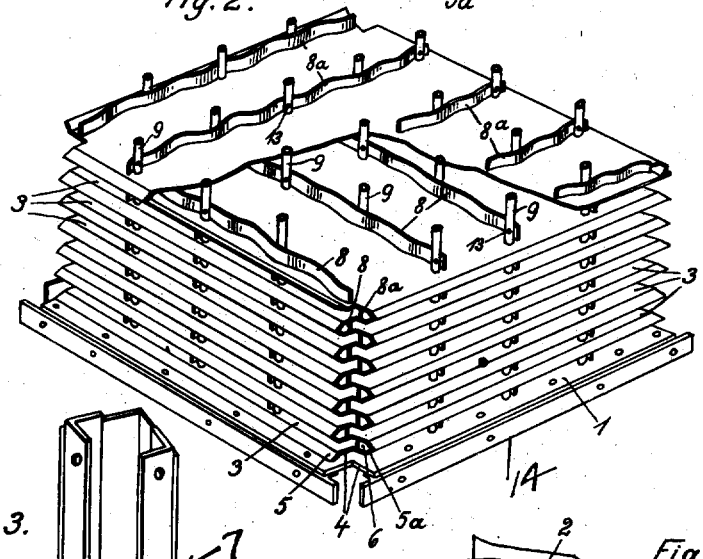
Fig. 2 is a view similar to Figure 1, the slide frames and the upper end plate being removed the upper intermediate plate being shown partly broken away.
Figure 3:
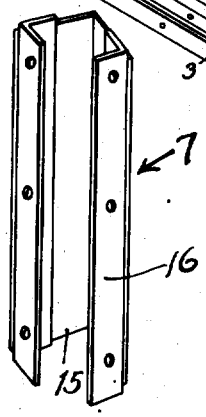
Fig. 3 is a detail view on a larger scale of one of the corner pieces.

The heat exchanging element *a* consists of a bottom plate 1, a top plate 2, and intermediate plates 3. All these plates have angle portions 4 cut out at the corners. The intermediate plates 3 have two of their edges bent upward and two bent downward so that for instance the edges 5 at the front and rear of the lower intermediate plate 3 are bent downward and the edges 5ª at the sides of the lower intermediate plate 3 are bent upward, while the next following plate has the edges at the front and rear bent upward and the side edges bent downward. In this manner, cells 6 are formed between the superposed plates 3 the said cells being alternately opened or closed at two opposite sides whereby two flues, each having a plurality of passages are formed, of which the one serves for the air or other medium to be heated and the other for the heating gases. The gas and air flues are separated one from the other by means of corner pieces 7 (Fig. 1) which are inserted where the portions 4 at the corners of the element have been cut out.

Figure 4:
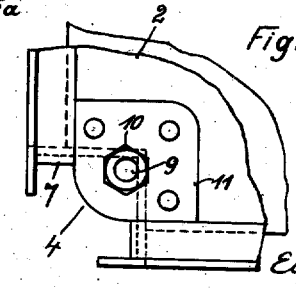
Fig. 4 is a detail view illustrating how the corner piece is fixed between the outer walls of the element.
Figure 5:
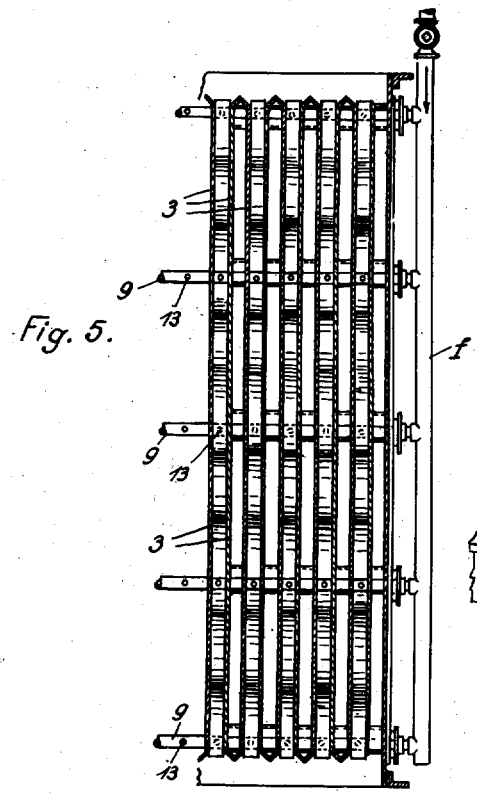
Fig. 5 is a section on the line 5—5 of Fig. 7 of an element with tubular transverse bolts for the blowing out of the gas cells.
Figure 10:
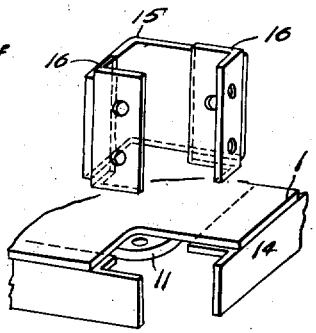
Fig. 10 is a detail perspective view of the lower portion of one of the corner pieces and a corner of the bottom plate with the angle bars thereof, the interfitting parts being separated.

The individual cells are subdivided by undulated strips 8 of sheet metal arranged parallel to the closed ends of the cells and serving at the same time for spacing the plates 3. In the outer plates 1 and 2, as well as in the intermediate plates 3, holes are provided which serve for the reception of the transverse bolts 9. These bolts are arranged in such a manner that they are situated alternately first on one side and then on the other of the undulated strips 8, 8ª of sheet metal. All of the plates of an element are rigidly connected one with the other by means of nuts 10 screwed upon the threaded ends of the transverse bolts 9. If the pressing together of the plates by the nuts should not be sufficient to make airtight joints between the individual elements, the edges in contact may be soldered together. The transverse bolts 9 in the corner pieces 7, which serve merely to connect the outer plates 1 and 2, pass through washers 11 (Fig. 4) placed upon the bottom plate 1 and the top plate 2. The transverse bolts are preferably tubular and the bolts in the gas flues have holes 13, as shown in Fig. 5, which correspond with the individual cells. The outer ends of these tubular transverse bolts are connected with the steam pipe *f* so that the gas flues can be blown out and cleaned by steam under pressure. The cleaning may be clearly done mechanically. The bottom plate 1 and the top plate 2 have flanges 14 between which the corner pieces 7 are inserted. The corner pieces 7 are built up of large angle bars 15 and smaller angle bars 16 and the angle bars 15 are fitted against the plates where the portions have been cut out at the corners. To make the joints gastight the plates may be secured to the bars 15 by soldering.

Figure 6:
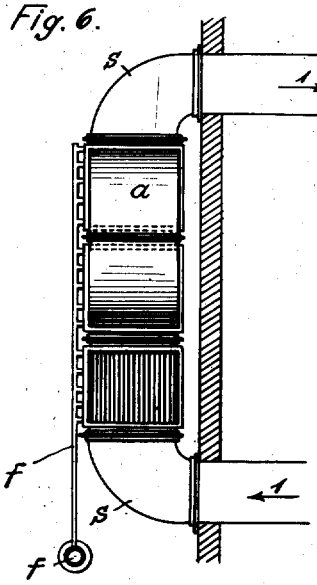
Fig. 6 is an end elevation of a heat exchanging battery composed of six elements.
Figure 7:
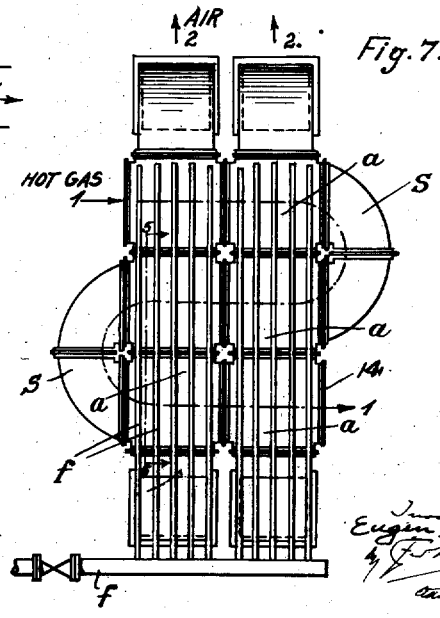
Fig. 7 is a side elevation of Fig. 6.

Although the heat exchanging elements can be made in any required dimensions, the sides of the same are however limited by the fact that in commerce, plates of sheet iron are to be obtained, only in determined dimensions. An enlargement of the elements by welding or riveting together the sheet iron plates found on the market would be much too expensive and troublesome, not to mention that it would be scarcely possible to protect such large plates against warping under the heat. If, therefore, larger heating surfaces are required than those of one element, several elements *a* are combined into a group (Figs. 6 and 7), return bends *s* being used for connecting the elements of the superposed rows in such a manner that the cells of the elements which are open at the side are connected the one with the other. Air is sent through aggregations of the elements in the direction of arrow 2, the heating gases flowing through the aggregation of elements in the direction of arrow 1 and having their direction of flow changed by the return bends *s*. By the arrangement described, a combined cross current of the two media, is produced which ensures an intense utilization of the heat. The individual elements can be connected and arranged in any convenient manner in accordance with the requirements of a determined direction of current. The return bends can be used either for the air flues or for the flues of heating gases or for both flues, according to the type of the plant. The end boxes of the gas channels of a group of elements and the return bends *s* serve as separators for the impurities admixed with the gases so that the cleaning of the apparatus is facilitated.

If the media traverse such an aggregate, a loss of speed will occur at each change of direction whereby the losses resulting from friction are considerably increased so that an undesirable decrease of speed might occur. This inconvenience may be avoided as shown in Figs. 8 and 9, by substituting a fan *v* for one of the return bends *s*.

Figure 8:
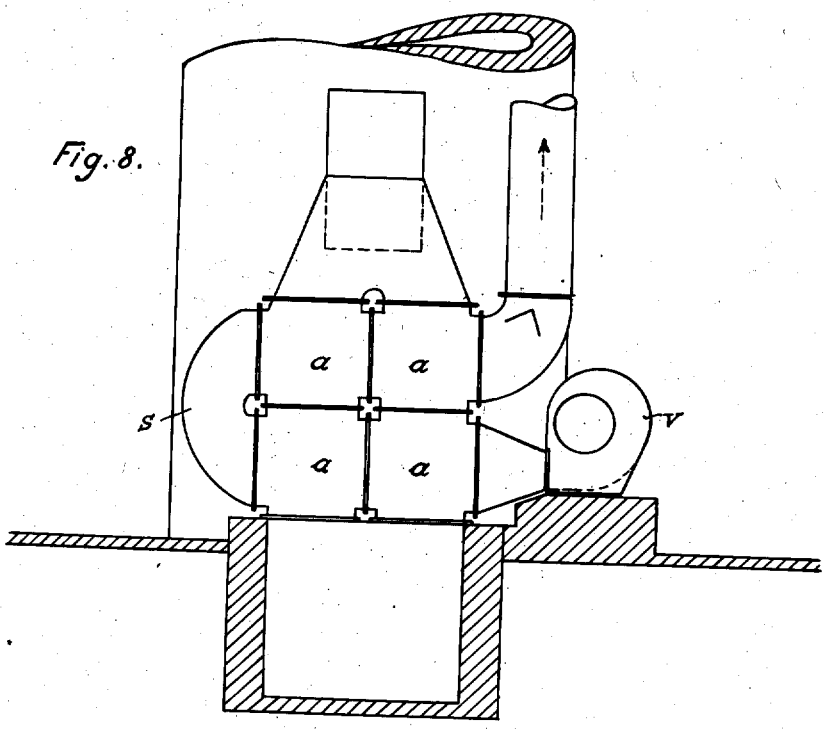
Figs. 8 and 9 show two ways of arranging the element in connection with a fan.

In the form of construction shown in Fig. 8, the direction of the air current only is altered and the speed of the air, is maintained by the fan *v*, the heating gases flowing directly through the elements from one end to the other in order to avoid any loss of draught of the chimney.

Figure 9:
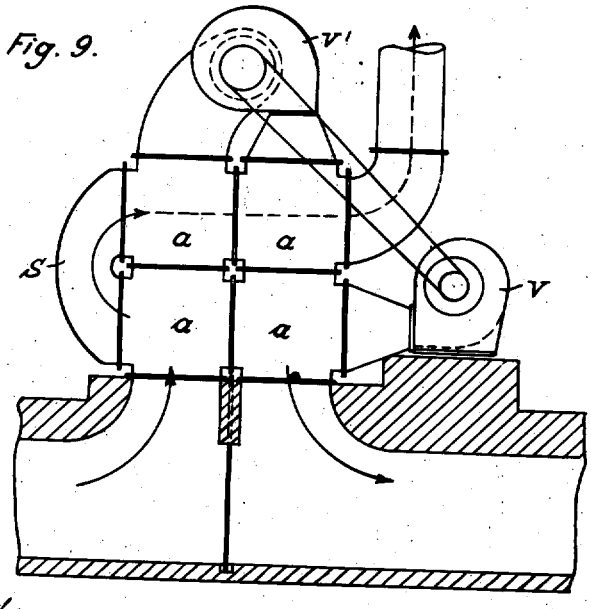

In the form of construction shown in Fig. 9, a fan *v* is preferably inserted between two elements. The deviation of the gases is effected without loss of speed since the fan overcomes the losses produced by friction in the return bends and by the variations of cross section.

I claim:

1. An improved heat exchanging element comprising in combination a bottom plate, a top plate and a plurality of intermediate plates, all of said plates having angle portions cut way at the corners, the edges at the ends and at the sides of the intermediate plates being alternately bent downward and upward so that by superposing the plates, cells are formed between said intermediate plates which are alternately open at the ends or the sides so that two flues are formed, and corner pieces inserted in the cut-away corners of all the plates to separate the air flue of the element from the flue for the heating gases.

2. An improved heat exchanging element comprising in combination a bottom plate, a top plate and a plurality of intermediate plates, all said plates having angle portions cut way at the corners, the edges at the ends and at the sides of the intermediate plates being alternately bent downward and upward so that by superposing the plates cells are formed between said intermediate plates which are alternately open at the ends or the sides so that two flues are formed, corner pieces inserted in the cutaway corners of all the plates to separate the air flue of the element from the flue for the heating gases and transverse bolts passing through the element from the bottom plate to the top plate, the outer ends of said bolts being threaded, nuts screwed upon said threaded ends of the bolts undulated strips of sheet metal arranged transversely to the open sides of the cells between every two intermediate plates and serving for spacing said plates.

3. An improved heat exchanging element comprising in combination a bottom plate, a top plate and a plurality of intermediate plates, all said plates having angle portions cut away at the corners, the edges at the ends and at the sides of the intermediate plates being alternately bent downward and upward so that by superposing the plates cells are formed between said intermediate plates which are alternately open at the ends or at the sides so that two flues are formed, corner pieces inserted in the cutaway corners of all the plates to separate the air flue of the element from the flue for the heating gases, undulated strips of sheet metal arranged between two intermediate plates parallel to the closed sides of the cells, the strips in one cell being parallel to each other and extending at right angles to the strips of sheet metal in the adjacent cells, bolts passing through the element from end plate to end plate and being alternately arranged on the two sides of the strips of undulated sheet metal so that they are in contact with said strips, the ends of said bolts being threaded, and nuts screwed upon the threaded ends of the bolts for rigidly holding together all the parts of an element.

4. In a heat exchanging element of the type described including air and gas flues, tubular transverse bolts extending through the air and gas flues, said hollow bolts having perforations located within the gas flues, a pressure pipe connected with the ends of said tubular bolts whereby fluid from said pressure pipe may be forced through into said tubular bolts into the gas flues to clean the latter.

5. A heat exchanging element of the type described comprising in combination a bottom plate, a top plate, a number of intermediate plates between said bottom and top plates, said intermediate plates having portions of the corners cut away, angular corner pieces inserted into said cutaway portions, and flanges fixed to said bottom and top plates and to said corner pieces so that a closed flanged frame encloses the open ends of the flues to directly connect two elements the one with the other.

6. A heat exchanging element of the class described comprising in combination, a bottom plate, a top plate, a number of intermediate plates between said bottom and top plates, said intermediate plates having portions of the corners cut away, angular corner pieces inserted into said cut-away portions, flanges fixed to said bottom and top plates and to said corner pieces so that a closed flanged frame encloses the open ends of the flues, a return bend fixed to said flanged frame of the element for connecting the said element to another similar element, and a fan in said return bend.

7. A heat exchanger composed of a group of separate unit sections each of which consists of metal plates and connecting and supporting means uniting to form a set of channels running in one direction and a set of channels running transversely to the first mentioned channels in each section with each adjacent pair of such channels separated by one of said plates, and means for connecting said sections to form a heat exchanging structure in which the channels of different unit sections are connected to provide separate flow paths for two fluids, each of which flow paths comprises one set of channels in each of a plurality of said sections, and one at least of which flow paths comprises channels in one section connected in series with channels in another section or sections.

Signed at New York, county of New York, State of New York this 10th day of September, 1927.

EUGEN HABER.